(12) United States Patent
Guillou

(10) Patent No.: US 10,975,741 B2
(45) Date of Patent: Apr. 13, 2021

(54) TWIN-SPOOL AIRCRAFT TURBOMACHINE COMPRISING A LUBRICANT TANK IN A COMPARTMENT BETWEEN FLOW STREAMS, AND IMPROVED MEANS OF FILLING THE TANK

(71) Applicant: SAFRAN AIRCRAFT ENGINES, Paris (FR)

(72) Inventor: Pierrot Guillou, Dammarie les Lys (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 122 days.

(21) Appl. No.: 16/441,316

(22) Filed: Jun. 14, 2019

(65) Prior Publication Data

US 2019/0383180 A1 Dec. 19, 2019

(30) Foreign Application Priority Data

Jun. 18, 2018 (FR) ...................................... 1855346

(51) Int. Cl.
*F02C 7/06* (2006.01)
*F01M 11/04* (2006.01)
(Continued)

(52) U.S. Cl.
CPC ......... *F01M 11/0458* (2013.01); *F01D 25/20* (2013.01); *F01M 1/02* (2013.01);
(Continued)

(58) Field of Classification Search
CPC .. F01M 11/0458; F01M 11/0408; F01M 1/02; F01D 25/20; F02C 7/06; F05D 2260/98
See application file for complete search history.

(56) References Cited

U.S. PATENT DOCUMENTS

| 4,002,224 A | * | 1/1977 | Easter | ..................... | F01D 25/20 |
| | | | | | 184/6.11 |
| 2006/0042223 A1 | * | 3/2006 | Walker | .................. | F01D 25/162 |
| | | | | | 60/39.08 |

(Continued)

FOREIGN PATENT DOCUMENTS

| EP | 1908929 A2 | 4/2008 |
| FR | 3046200 A1 | 6/2017 |

OTHER PUBLICATIONS

Search Report issued in French Patent Application No. 1855346 dated Mar. 12, 2019.

*Primary Examiner* — Steven M Sutherland
(74) *Attorney, Agent, or Firm* — Pearne & Gordon LLP

(57) ABSTRACT

An aircraft twin-spool turbomachine comprises an inter flow compartment (50) housing a fuel tank (54), the exterior of the inter flow compartment being delimited by a cover (52) delimiting the interior of a bypass flow (14*b*) of the turbomachine, the cover comprising a closable access (64) to a remote lubricant tank filling orifice (74). The turbomachine also comprises: an overflow evacuation orifice (82) located on the tank lower than the lubricant inlet orifice (68); a lubricant overflow evacuation conduit (84) routed downwards from the overflow evacuation orifice (82); a controlled evacuation valve (88), associated with the overflow evacuation orifice (82); and a control device (90, 94) for the evacuation valve (88), the control device being accessible through the access (64).

17 Claims, 3 Drawing Sheets

(51) Int. Cl.
  *F01D 25/20* (2006.01)
  *F01M 1/02* (2006.01)
  *F02K 3/06* (2006.01)

(52) U.S. Cl.
  CPC ........... *F01M 11/0408* (2013.01); *F02C 7/06* (2013.01); *F02K 3/06* (2013.01); *F05D 2260/98* (2013.01)

(56) References Cited

U.S. PATENT DOCUMENTS

| | | | |
|---|---|---|---|
| 2010/0326048 A1* | 12/2010 | Lozier | B64D 37/04 60/262 |
| 2011/0314830 A1* | 12/2011 | Legare | F01D 25/20 60/772 |
| 2013/0291514 A1 | 11/2013 | Suciu et al. | |

* cited by examiner

TWIN-SPOOL AIRCRAFT TURBOMACHINE COMPRISING A LUBRICANT TANK IN A COMPARTMENT BETWEEN FLOW STREAMS, AND IMPROVED MEANS OF FILLING THE TANK

TECHNICAL FIELD

This invention relates to the field of aircraft twin-spool turbomachine.

It particularly concerns such a turbomachine in which an inter flow compartment in the turbomachine houses one or several lubricant tanks. For example, a solution of this type is known from document FR 3 046 200 A1.

STATE OF PRIOR ART

On twin-spool turbomachines, there is a compartment between a primary flow stream and a secondary flow stream, this compartment normally being referred to as the inter flow compartment. It houses several items of equipment, for which access is sometimes made difficult due to the high density of this equipment, in a relatively restricted space.

This access problem can occur for a lubricant tank located in the inter flow compartment. It is sometimes difficult to fill the tank due to the difficult access in this very dense environment. This problem can be solved by transferring filling means so as to move to a distance from the congested zone of the inter flow compartment. In such a case, control of filling can prove to be complicated because the operator is at a distance from the lubricant tank, and does not necessarily have visual access to the tank.

Consequently there is a need to optimise existing designs in order to facilitate control of filling operations of the tank formed in the inter flow compartment.

SUMMARY OF THE INVENTION

To satisfy this need, the purpose of the invention is an aircraft twin-spool turbomachine comprising an inter flow compartment housing a lubricant tank, the inter flow compartment being delimited on the outside by a cover delimiting a bypass flow stream of the turbomachine on the inside, said cover comprising a closable access to a remote lubricant tank filling orifice, and the turbomachine also comprising a filling duct between the remote filling orifice and a lubricant inlet orifice provided on the top part of the tank.

According to the invention, the turbomachine also comprises:
- an overflow evacuation orifice lower on the tank than the lubricant inlet orifice;
- a lubricant overflow evacuation conduit leading downwards from the overflow evacuation orifice;
- a controlled evacuation valve associated with the overflow evacuation orifice; and
- an evacuation valve control device, the control device being accessible through said access.

Due to the presence of the evacuation orifice and the overflow evacuation conduit, it becomes easy for an operator to know when to stop filling, even when he performs this operation without visual access to the tank. Furthermore, since the operator controls the evacuation valve by inserting his or hand or arm through the same access used for remote filling of lubricant, the proposed architecture is advantageously simple and functional. Finally, in the closed position as adopted during flight, the evacuation valve prevents lubricant leaks outside the tank.

The invention preferably includes at least one of the following optional characteristics, taken in isolation or in combination.

The evacuation valve control device comprises a control element accessible through the access, and preferably a cable connecting the control element to the evacuation valve. In this preferred example, the solution is mechanical. However, the evacuation valve may be electrical, and remote controlled by a button type control element arranged close to the remote filling orifice.

The turbomachine comprises a controlled filling valve associated with the lubricant inlet orifice provided on the top part of the tank, and the evacuation valve control device is configured so as to also control said filling valve through the same control element. This additional control is made for example using another cable or using a movement transmission device located between the two valves concerned.

According to one possibility, a mechanical coupling link is provided to connect the evacuation valve and the filling valve to each other, so that actuation of one of these valves also causes actuation of the other valve. In particular, this limits the length/routing of cables.

The control device is a lever, preferably hinged close to the remote filling orifice.

As an alternative to the filling valve solution, lubricant return prevention means can be provided associated with the lubricant inlet orifice provided on the top part of the tank.

Regardless of the adopted solution, the lubricant overflow evacuation conduit preferably has a free bottom end, or connected to a drain connected to a lubricant filling dish through which said remote filling orifice is formed. In the first case, the operator controlling filling monitors any leaks from the free end of the overflow evacuation conduit, while in the second case leaks through the drain outlet connected to the filling dish are monitored.

Said free bottom end of the overflow evacuation conduit is preferably closed by a removable plug.

Said remote filling orifice is preferably closed by a removable plug accessible through the access.

Finally, the lubricant tank is located upstream from a high pressure body of the turbomachine, and preferably around a low pressure compressor forming part of a low pressure body of the turbomachine. The access is preferably located downstream from the low pressure compressor, and more preferably around a combustion chamber of the turbomachine and/or a high pressure compressor of the turbomachine.

Another purpose of the invention is a method of filling a lubricant tank of such a turbomachine, including the following successive steps:
- open the closable access;
- allow lubricant to enter the remote filling orifice, with the evacuation valve set in the open position via the control device;
- surveillance of lubricant evacuation through the overflow evacuation conduit;
- stop filling lubricant and close the evacuation valve after it is detected that lubricant is being evacuated through the overflow evacuation conduit; and
- close the access.

Other advantages and characteristics of the invention will become clear after reading the following detailed non-limitative description.

BRIEF DESCRIPTION OF THE DRAWINGS

This description will be made with reference to the appended drawings among which.

DETAILED DESCRIPTION OF PREFERRED EMBODIMENTS

Figure 1:
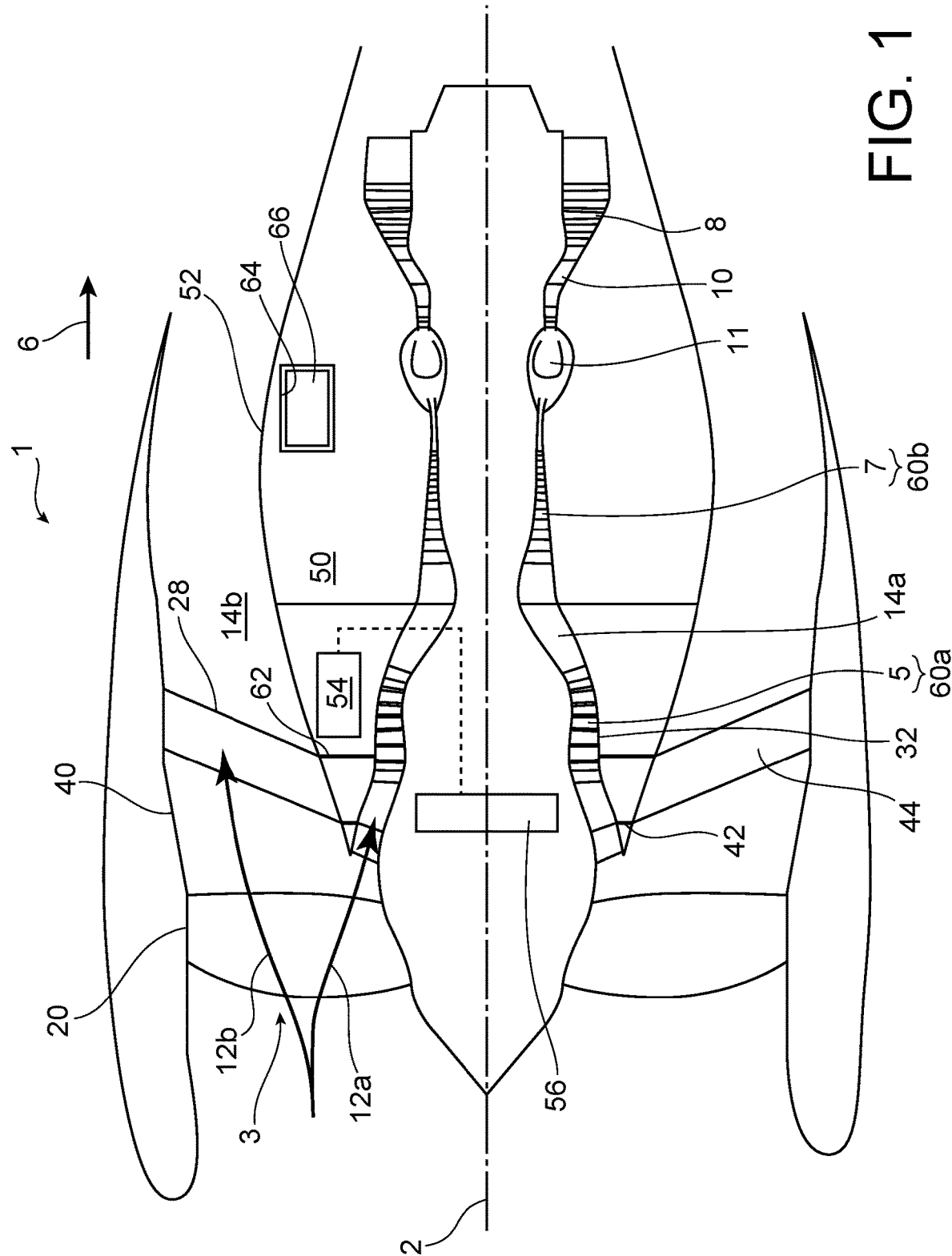
FIG. 1 diagrammatically represents a longitudinal sectional view of a twin-spool turbomachine according to the invention.

With reference to FIG. 1, the figure shows an aircraft twin-spool turbomachine 1, of the twin-spool turbofan type.

Throughout the following description, by convention the terms "upstream" and "downstream" should be considered with regard to a principal gas flow direction through the turbomachine, this direction being diagrammatically represented by the arrow 6.

The turbomachine 1 with central longitudinal axis 2 comprises, in order from upstream to downstream, a low pressure compressor 5, a high pressure compressor 7, a combustion chamber 11, a high pressure turbine 10 and a low pressure turbine 8.

Conventionally, after having passed through the fan, air is split into a central core engine flow 12a and a fan flow 12b surrounding the core engine flow. The core engine flow 12a passes in a main gas circulation stream 14a passing through the compressors 5, 7, the combustion chamber 11, and turbines 10, 8. The secondary flow stream 12b flows in a bypass stream 14b delimited radially outwards by a fan case 20 upstream from the turbomachine. This delimitation continues in the downstream direction by an outer shell 40 of an intermediate case 28 fixed on downstream end of the fan case 20. In this respect, it is noted that conventionally, the intermediate case 28 not only includes the shell 40, but also a hub 42, and radial arms connecting the hub 42 to the outer shell 40. The hub 42 is connected to a central case 32, also called the core case, that extends in the downstream direction from this hub. This hub forms an upstream delimitation of an inter flow compartment 50 housing a plurality of equipment. The compartment 50 is thus delimited radially inwards by the central case 32, and radially outwards by one or several covers 52 forming the inner delimitation of the bypass flow stream 14b. In the upstream direction, the inter-flow compartment 50 is more precisely delimited by a downstream flange 62 of the hub of the intermediate case.

Only one lubricant tank 54 among the large amount of equipment housed in the upstream part of the inter flow compartment 50 is represented, for reasons of clarity on the figure. This tank 54 will supply lubricant to surrounding elements, through one or several pumps housed in the compartment 50. This is the case particularly for a reduction gear 56 entrained by a low pressure body 60a comprising the compressor 5 and the turbine 8. Conventionally, the low pressure body 60a is additional to a high pressure body 60b comprising the compressor 7 and the turbine 10. The reduction gear 56 is designed to drive the fan 3, so that it rotates at a rotation speed slower than the low pressure body 60a.

The lubricant tank 54 is located close to the downstream flange 62 of the hub 42 of the intermediate case. In the inter-flow compartment 50, the tank 54 is arranged around the low pressure compressor 5, in her words upstream from the high pressure body 60b. For example, the tank 54 may have a partially annular shape, extending circumferentially around the low pressure compressor 5.

Furthermore, the cover 52 is provided with a closable access 64, that forms an opening in this cover. This access 64 is sized such that an operator's hand or arm can pass through it. Thus, the operator can access one or several items of equipment housed in the inter flow compartment 50 delimited by the cover. Typically, the access is globally square or rectangular in shape, with each side measuring for example between 10 cm and 40 cm. In flight, this access 64 is closed off by a removable fairing 66 or is free to move on the access 64 to be able to adopt a closed position and an open position, providing access to equipment.

The closable access 64 is dedicated in particular to remote filling of the tank 50 with lubricant, as will be described in detail with reference to the following figures. It is located in a more accessible part downstream from the tank 50 and the low pressure compressor 5, and more preferably downstream from the high pressure compressor 7, around the combustion chamber 11.

Figure 2:
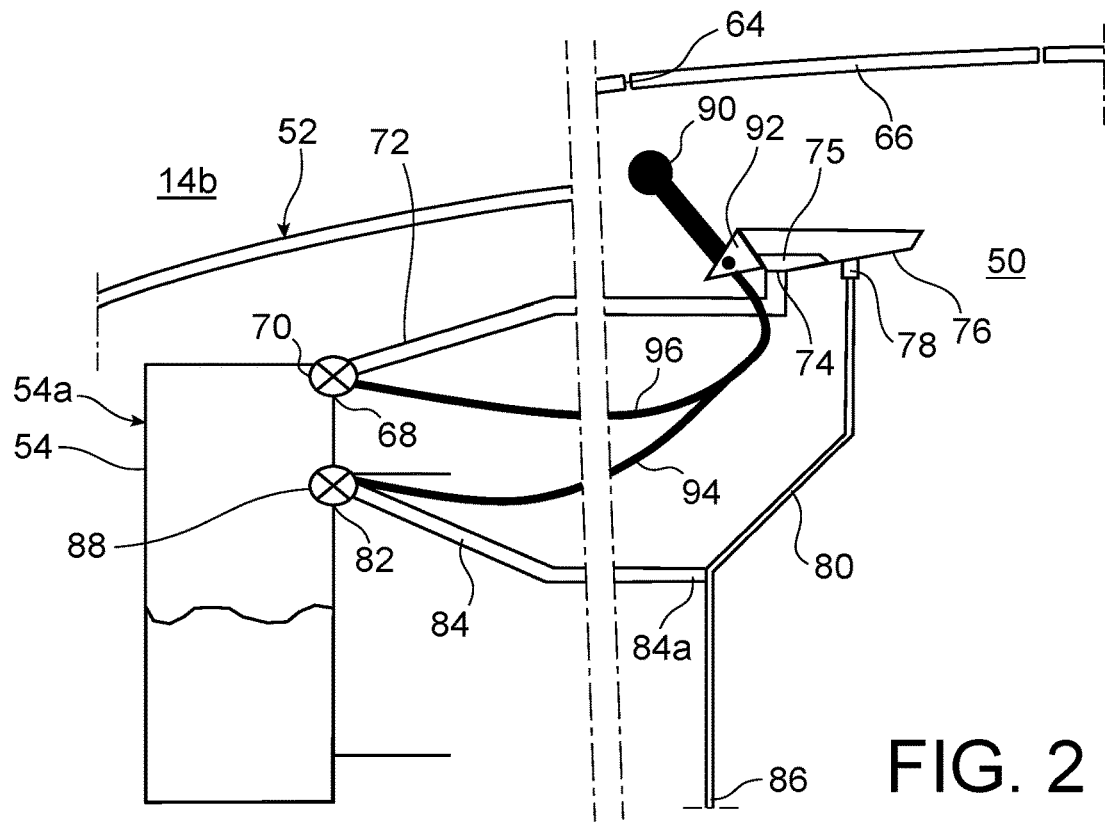
FIG. 2 shows a diagrammatic view of a part of an inter flow compartment of the turbomachine, according to a first preferred embodiment of the invention.

With reference to FIG. 2, the figure shows the tank 54 in enlarged form in its inter flow compartment 50. In the top part 54a, this tank comprises an orifice through which lubricant 68 is added, and on which a controlled filling valve 70 is installed. The lubricant inlet orifice 68 is connected to a filling conduit 72 extending in the downstream direction, and connecting it to a remote tank filling orifice 74. This orifice 74 passes through the bottom of a lubricant filling dish 76, fixed in the inter flow compartment 50. The access 64 is designed so that an operator can access the remote filling orifice 74, by passing his or her hand or arm through this access. In other words, the orifice 74 is radially facing the access 64, at a distance preferably not exceeding 0.4 m. Alternatively, this orifice 74 can be slightly offset from the access 64 in the axial direction, while remaining accessible to the operator through this access. It is fitted with a plug 75 that can be removed through the access 64, for example a plug screwed in the remote orifice 74.

Alternatively, the access 64 can be closed off by a part fixed to the removable plug 75, this part possibly forming surface continuity with the cover 52 delimiting the inside of the turbomachine bypass flow stream. This part is configured such that its placement to close off the access 64 is such that the plug 75 will close the remote filling orifice 74.

The filling dish 76 has an overflow prevention function making use of a special-purpose orifice 78, that is higher than the remote filing orifice 74. A drain 80 extends downwards from this orifice 78, to evacuate any lubricant that overflows from the dish during filling, downwards. This surplus lubricant is preferably collected at the outlet 86 from the drain 80 through a special-purpose vessel (not shown) located for example outside the inter flow compartment 50 in a zone closer to the ground and more accessible than this compartment. The pipe forming the drain 80 may for example pass radially through the bypass flow stream through a drain arm located at six o'clock for the drain passage, or even also for ancillaries, so that the outlet 86 of the drain 80 is connected to a low point of a nacelle surrounding the turbomachine. For example, lubricant that escapes through this outlet 86 can be recovered in a receptacle placed on the ground, to keep the tarmac clean.

One of the special features of the invention lies in the presence of an overflow evacuation orifice 82 located on the tank lower than the lubricant inlet orifice, but still in the upper part 54a of this tank. The two orifices 68, 82 are thus offset from each other in the vertical direction, but preferably are offset along another direction orthogonal to the vertical direction. In assuring that the orifice 82 is not vertically in line with the orifice 68, this arrangement can eliminate the risk that lubricant added through the orifice 68 is accidentally brought out of the tank through the orifice 82.

A lubricant overflow evacuation conduit 84 is routed downwards from the overflow evacuation orifice 82. In this first preferred embodiment, the low end 84*a* of the conduit 84 is connected to the dish drain 80 such that only one common lubricant outlet 86 is kept.

The overflow evacuation orifice 82 is equipped with a controlled evacuation valve 88. A control device is provided to control this valve 88, comprising a manual control element 90 accessible through the access 64. This element 90 is preferably a control lever, hinged on a fitting 92 fixed to the dish 76. The control lever 90 is thus located close to the remote filling orifice 74, while also facing the access 64 in the radial direction so that the operator can easily manipulate it with his or her hand. The control level 90 is connected to a cable 94 connected to the evacuation valve 88. By operating the lever 90, the valve 88 can be brought into an open position adopted while filling the tank 54, when the turbomachine is stopped, to a closed position adopted during operation of the turbomachine, and vice versa. In this way, it is possible to detect the instant at which the reservoir is completely filled, by identifying evacuation of lubricant through the outlet 86 common to the drain 80 and the overflow evacuation conduit 84. It is thus possible to avoid lubricant leaks in operating conditions of the turbomachine, due to closure of the evacuation valve 88.

For simplicity of use, the lever 90 also controls the filling valve 70, for example through another cable 96 connecting the lever 90 to the valve 70. According to one possible variant of the first preferred embodiment of the invention, a single cable 94 or 96 is used to connect the lever 90 to one of the valves 70, 88, and a mechanical coupling connection is provided by a cable, a rod or any equivalent means, for example on the outside wall of the tank, to connect the two valves together so as to mutually couple the positions of each (open or closed). Thus, actuation of one valve also causes actuation of the other valve. In this first embodiment including its variant mentioned above, the valves 70, 88 are opened mechanically and simultaneously, by operating the hinged lever 90. The same applies for closing them.

Figure 3:
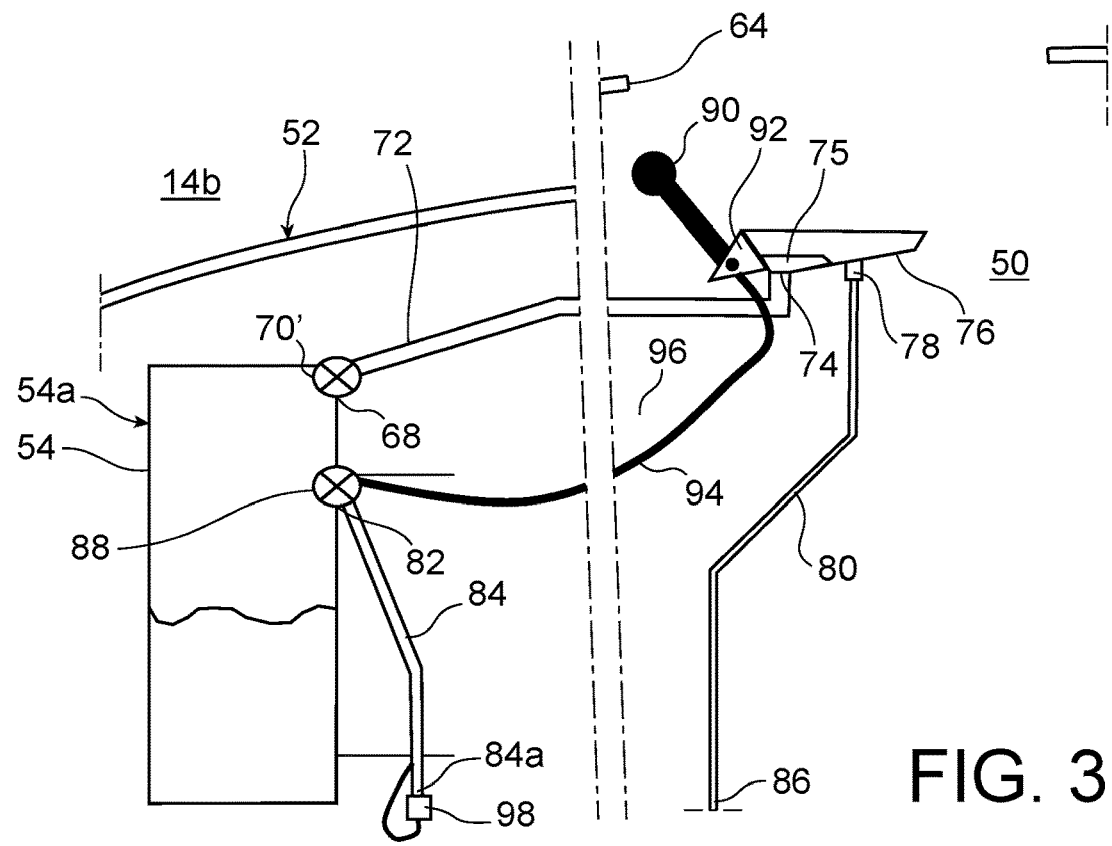
FIG. 3 represents a view similar to the view in FIG. 2, according to a second preferred embodiment of the invention.

According to a second embodiment shown on FIG. 3, the filling valve is replaced by a single non-return valve 70' or an equivalent means, preventing lubricant from returning from the tank to the filling conduit 72 during operation of the turbomachine. Therefore the control lever 90 no longer controls the evacuation valve 88.

Furthermore, in this second preferred embodiment, the overflow evacuation conduit 84 has a low end 84*a* that is no longer connected to the dish drain 80, but that remains free and independent of the drain. This low end 84*a* is then preferably equipped with a removable plug 98, preferably screwed, and removed during filling so as to monitor whether lubricant is evacuated as a sign that tank filling is complete.

As an alternative to monitoring a lubricant flow through the low end 84*a* of the overflow evacuation conduit 84, an electrosensitive element can be provided to be installed in the evacuation conduit 84, for example capable of detecting the modification of a resistivity in the presence of oil, and connected to a visual indicator located at the filling access 64 so that the operator doing the filling can monitor the visual overflow indicator at the same time.

The fact that the overflow evacuation conduit 84 is not connected to the dish drain 80 has a particular advantage when replacing the filling valve with a non-return valve, or an equivalent means. If the non-return valve 70' remains blocked closed while the reservoir 54 is being filled, the filling conduit 72 will continue to be filled until there is a backflow in the dish 76 and lubricant will be evacuated through the dish drain 80. The operator doing the filling might not notice the lubricant reflux in the dish to the drain 80, even if the dimensions and the shape of the dish can be adapted to make such a lubricant backflow particularly visible to the operator. If the outlet 86 were common to the drain 80 and to the overflow evacuation conduit 84, evacuation of lubricant through the outlet 86, that can be identified by the same operator or by a second operator, could be interpreted as signalling the end of filling of the tank, although in fact the tank has a deficit of lubricant. On the other hand, with a non-common outlet 86, evacuation of lubricant through the outlet 86 necessarily means that this lubricant originates from the dish 76.

In this case also, surplus lubricant is preferably collected at the low end 84*a* through a dedicated vessel (not shown), located for example outside the inter flow compartment 50, in a zone closer to the ground and more accessible than this compartment. Once again, in the same way as for the drain 80, the overflow evacuation conduit 84 will be able to pass radially through the bypass path through a drain arm located at six o'clock, such that its low end 84*a* is at a low point of a nacelle surrounding the turbomachine.

The invention can also be implemented through a third embodiment making use of all the characteristics of the first preferred embodiment, and particularly a filling valve controlled by the evacuation valve control device, except the characteristic related to the lubricant outlet common to the overflow evacuation conduit 84 and the dish drain 80. It is possible to provide an outlet 86 from the drain 80 separate from the outlet from the overflow evacuation conduit 84, as planned in the second preferred embodiment, regardless of the closing system (controlled valve or non-return valve) of the lubricant inlet orifice 68 located on the tank.

Figure 4:
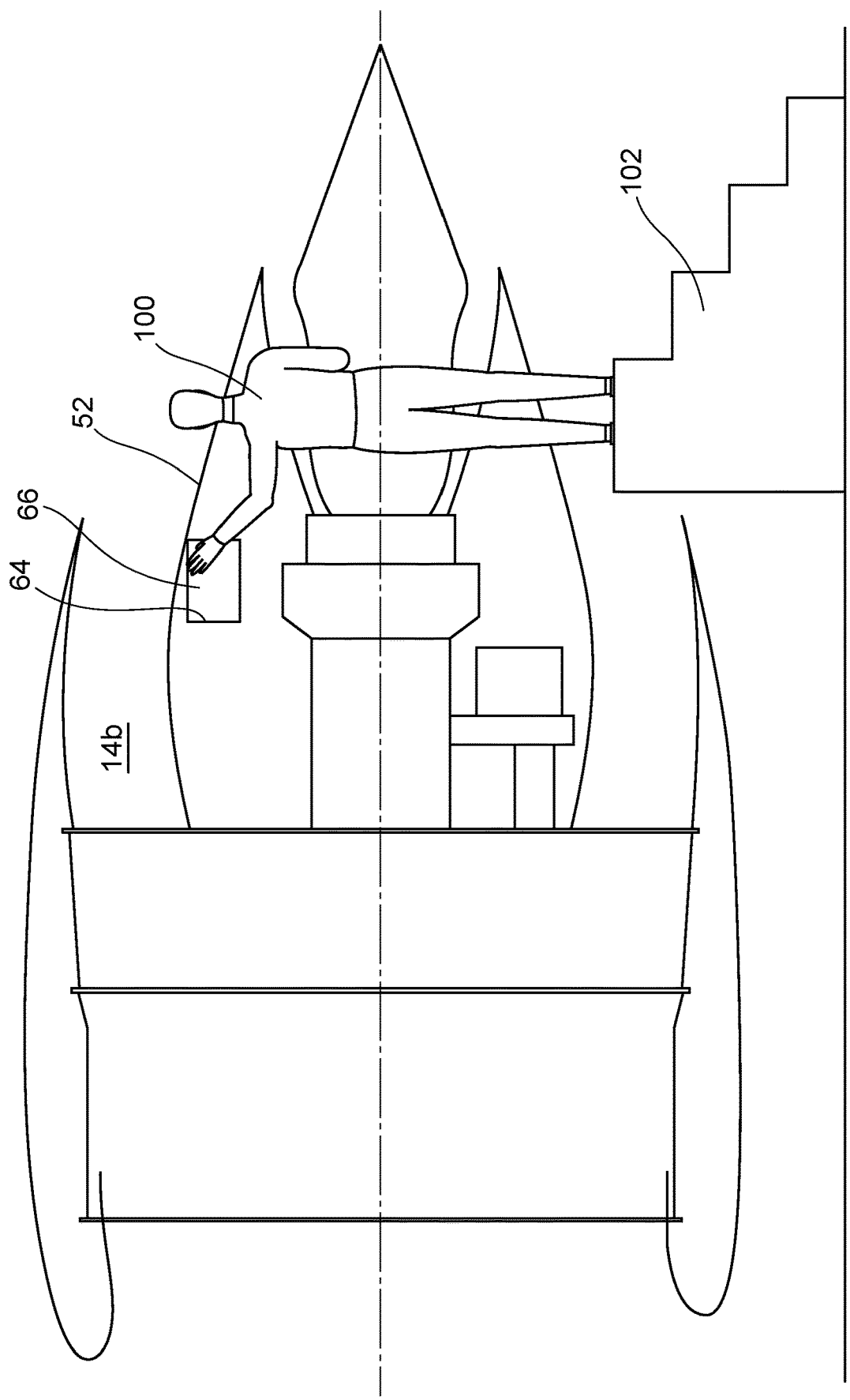
FIG. 4 represents an operator arranged adjacent to the turbomachine represented on the previous figures, before implementation of a method of filling a lubricant tank arranged in the inter flow compartment.

In each of the embodiments described above, the operator fills the tank 54 by firstly getting into position at the inter flow compartment 50, so as to access the fairing 66 closing off the access 64. To achieve this, the operator 100 can stand on a platform 102 as shown diagrammatically on FIG. 4. He or she then releases/opens the access 64 by pulling away the fairing 66, or by bringing it into the open position. When this fairing 66 is fixed to the plug 75, the plug is thus removed at the same time as the fairing 66. Otherwise, the plug 75 of the remote filling orifice 74 is removed by passing a hand through the access 64, and the operator then adds lubricant into the remote orifice 74, through the same access. This lubricant is added with at least valve 88 previously put into the open position, using the control lever 90.

During filling, lubricant flows by gravity into the dish 76, then into the remote orifice 74, the filling conduit 72, then into the tank 54 through the filling valve 70 previously put into the open position or using the non-return valve 70'. The operator monitors whether lubricant is evacuated through the overflow evacuation conduit 84, through the free low end 84*a* or the common outlet 86, depending on the embodiment of the turbomachine.

When such lubricant evacuation is detected, this means that the tank high level has been reached. The operator then stops filling and closes valves 70, 88 in the first embodiment, or only closes valve 88 in the second embodiment in which a single non-return valve 70' (or an equivalent means) forms a filling valve adapted to close autonomously when the flow passing through it stops.

Finally, the access 64 is closed off by reinstalling the fairing 66, or bringing it into the closed position.

Obviously, an expert in the subject can make various modifications to the invention as it has just been described solely through non-limitative examples, within the scope defined by the appended claims. In particular, the technical characteristics of the different embodiments can be combined together.

The invention claimed is:

1. An aircraft twin-spool turbomachine (1) comprising:
    an inter flow compartment (50) housing a lubricant tank (54), the exterior of the inter flow compartment being delimited by a cover (52) delimiting an interior of a bypass flow stream (14b) of the aircraft twin-spool turbomachine (1), said cover (52) comprising a closable access (64) to a remote lubricant tank filling orifice (74),
    a filling conduit (72) connecting the remote filling orifice (74) to a lubricant inlet orifice (68) provided on a top part (54a) of the lubricant tank (54);
    an overflow evacuation orifice (82) located on the lubricant tank (54) lower than the lubricant inlet orifice (68);
    lubricant overflow evacuation conduit (84) routed downwards from the overflow evacuation orifice (82);
    a controlled evacuation valve (88), associated with the overflow evacuation orifice (82); and
    a control device (90, 94) for the evacuation valve (88), the control device being accessible through said closable access (64).

2. The aircraft twin-spool turbomachine (1) according to claim 1, wherein the control device (90,94) comprises a control element (90) accessible through said closable access (64).

3. The aircraft twin-spool turbomachine (1) according to claim 2, wherein the aircraft twin-spool turbomachine (1) comprises a controlled filling valve (70), associated with the lubricant inlet orifice (68) provided on the upper part (54a) of the reservoir, and in that the control device (90,94) is configured to also control said controlled filling valve (70), through the control element (90).

4. The aircraft twin-spool turbomachine (1) according to claim 3, wherein a mechanical coupling link is provided to connect the evacuation valve (88) and the controlled filling valve (70), so that actuation of one of these valves (70, 88) also causes actuation of the other valve.

5. The aircraft twin-spool turbomachine (1) according to claim 2, wherein the control element (90) is a lever.

6. The aircraft twin-spool turbomachine (1) according to claim 5, wherein the lever is articulated close to the remote filling orifice (74).

7. The aircraft twin-spool turbomachine (1) according to claim 2, wherein the aircraft twin-spool turbomachine (1) comprises lubricant non return means (70'), associated with the lubricant inlet orifice (68) provided on the top part (54a) of the lubricant tank.

8. The aircraft twin-spool turbomachine (1) according to claim 2, wherein the control device (90,94) comprises a cable (94) connecting the control element (90) to the evacuation valve (88).

9. The aircraft twin-spool turbomachine (1) according to claim 1, wherein a bottom end (84a) of the lubricant evacuation overflow conduit (84) is free, or is connected to a drain (80) connected to a lubricant filling dish (76) through which said remote filling orifice (74) is formed.

10. The aircraft twin-spool turbomachine (1) according to claim 9, wherein said bottom end (84a) of the lubricant overflow evacuation conduit (84) is closed by a removable plug (98).

11. The aircraft twin-spool turbomachine (1) according to claim 1, wherein the lubricant tank (54) is located upstream from a high pressure body (60b) of the aircraft twin-spool turbomachine (1).

12. The aircraft twin-spool turbomachine (1) according to claim 11, wherein the lubricant tank (54) is located around a low pressure compressor (5) belonging to a low pressure body (60a) of the turbomachine.

13. The aircraft twin-spool turbomachine (1) according to claim 12, wherein said closable access (64) is located downstream from the low pressure compressor (5).

14. The aircraft twin-spool turbomachine (1) according to claim 13, wherein said closable access (64) is located around a combustion chamber (11) of the aircraft twin-spool turbomachine (1).

15. The aircraft twin-spool turbomachine (1) according to claim 14, wherein said closable access (64) is located around a high pressure compressor (7) of the turbomachine.

16. The aircraft twin-spool turbomachine (1) according to claim 13, wherein said closable access (64) is located around a high pressure compressor (7) of the turbomachine.

17. A method of filling the lubricant tank (54) of the aircraft twin-spool turbomachine (1) according to claim 1, the method comprising the following steps in sequence:
    open the closable access (64);
    add lubricant into the remote filling orifice (74), with the controlled evacuation valve (88) arranged in an open position through the control device (90, 94);
    monitor lubricant evacuation through the lubricant overflow evacuation conduit (84);
    stop filling lubricant and close the evacuation valve (88) after detection of lubricant evacuation through the lubricant overflow evacuation conduit (84); and
    close the closable access (64).

* * * * *